US009446829B1

(12) United States Patent
Williams et al.

(10) Patent No.: US 9,446,829 B1
(45) Date of Patent: Sep. 20, 2016

(54) TRANSMISSIONS FOR OUTBOARD MARINE ENGINES HAVING INTERNAL RING GEAR AND LAYSHAFT

(71) Applicant: Brunswick Corporation, Lake Forest, IL (US)

(72) Inventors: Cameron Philip Williams, Dexter, MI (US); Jiri Jager, Prague (CZ)

(73) Assignee: Brunswick Corporation, Lake Forest, IL (US)

( * ) Notice: Subject to any disclaimer, the term of this patent is extended or adjusted under 35 U.S.C. 154(b) by 4 days.

(21) Appl. No.: 14/578,669

(22) Filed: Dec. 22, 2014

(51) Int. Cl.
| | | |
|---|---|---|
| *B63H 23/30* | (2006.01) | |
| *B63H 20/14* | (2006.01) | |
| *B63H 20/20* | (2006.01) | |
| *F16H 3/04* | (2006.01) | |
| *B63H 5/10* | (2006.01) | |
| *B63H 23/02* | (2006.01) | |
| *B63H 20/00* | (2006.01) | |

(52) U.S. Cl.
CPC .............. *B63H 20/20* (2013.01); *B63H 5/10* (2013.01); *B63H 20/14* (2013.01); *B63H 21/28* (2013.01); *B63H 23/30* (2013.01); *F16H 3/04* (2013.01); *B63H 2020/006* (2013.01); *B63H 2023/0283* (2013.01)

(58) Field of Classification Search
CPC ........ B63H 20/20; B63H 20/14; B63H 5/10; B63H 21/28; B63H 23/30; B63H 2020/006; B63H 2023/0283; B63H 20/002; F16H 3/04; Y10T 29/49464
USPC ..................................................... 440/75, 76
See application file for complete search history.

(56) References Cited

U.S. PATENT DOCUMENTS

| | | | |
|---|---|---|---|
| 2,688,298 A * | 9/1954 | Long ..................... | B63H 20/10 440/86 |
| 3,994,254 A | 11/1976 | Woodfill | |
| 4,173,939 A | 11/1979 | Strang | |
| 4,323,354 A | 4/1982 | Blanchard | |
| 4,331,432 A | 5/1982 | Blanchard | |
| 4,343,612 A | 8/1982 | Blanchard | |
| 4,400,163 A | 8/1983 | Blanchard | |
| 5,403,218 A | 4/1995 | Onoue et al. | |
| 5,494,466 A | 2/1996 | Vernea | |
| 7,891,263 B2 | 2/2011 | Mowbray et al. | |
| 8,303,359 B2 | 11/2012 | Matsuda et al. | |
| 2007/0125192 A1 | 6/2007 | Mowbray et al. | |
| 2014/0031164 A1* | 1/2014 | Fukuoka ................ | B63H 23/06 475/331 |
| 2014/0031166 A1* | 1/2014 | Nakamura ............ | B63H 20/14 475/343 |
| 2014/0045393 A1 | 2/2014 | Kuriyagawa et al. | |

* cited by examiner

*Primary Examiner* — Anthony Wiest
(74) *Attorney, Agent, or Firm* — Andrus Intellectual Property Law, LLP

(57) ABSTRACT

A transmission is for an outboard marine engine. The transmission comprises a rotatable input shaft that is rotated by an internal combustion engine, a rotatable output shaft that powers a propulsor, a forward gear that causes forward rotation of the output shaft and propulsor, a reverse gear that causes reverse rotation of the output shaft and propulsor, a clutch that is movable between a forward clutch position wherein the forward gear causes the forward rotation of the output shaft and propulsor and a reverse clutch position wherein the reverse gear causes the reverse rotation of the output shaft and propulsor, and an internal ring gear that couples the output shaft to one of the forward gear and the reverse gear.

20 Claims, 3 Drawing Sheets

TRANSMISSIONS FOR OUTBOARD MARINE ENGINES HAVING INTERNAL RING GEAR AND LAYSHAFT

FIELD

The present disclosure relates to outboard marine engines, and in certain examples to transmissions for outboard marine engines.

BACKGROUND

The following US Patents and patent applications are incorporated herein by reference:

U.S. Pat. No. 3,994,254 discloses a multiple-speed transmission for coupling an engine to the impeller of a marine jet drive, such that an overdrive connection powers the jet drive under operating conditions up to a predetermined upper limit of cruising speeds and such that a reduced drive, for example a direct-drive connection, is automatically established for jet-drive speeds in excess of the cruising conditions.

U.S. Pat. No. 4,173,939 discloses a marine propulsion device that incorporates a two-speed transmission including a first drive gear which is mounted for common rotation with an input shaft drivingly connected to an engine and which meshes with a first driven gear mounted for rotation coaxially with a drive shaft drivingly connected to the propeller shaft and further including a second drive gear which is mounted for rotation coaxially with and independently of the input shaft and which meshes with a second driven gear mounted for common rotation with the drive shaft.

U.S. Pat. No. 4,323,354 discloses a marine propulsion device that includes an input shaft drivingly connected to a power source, a lower unit having a rotatably mounted drive shaft extending in coaxial relation to the input shaft, and a propeller shaft rotatably mounted in the lower unit, the propeller shaft carrying a propeller. A two-speed transmission is provided to drivingly connect the input shaft to the drive shaft.

U.S. Pat. No. 4,331,432 discloses a marine propulsion device that includes an input shaft drivingly connected to a power source, a lower unit having a rotatably mounted drive shaft extending in coaxial relation to the input shaft, a rotatably mounted propeller shaft carrying a propeller and drivingly connected to the propeller shaft, and a two-speed transmission drivingly connecting the input shaft to the drive shaft.

U.S. Pat. No. 4,343,612 discloses an outboard motor that includes a power head having an engine, a propulsion leg extending downwardly from the power head, an input shaft housed in the propulsion leg and driven by the engine, a drive shaft housed in the propulsion leg, a propeller shaft in the propulsion leg and drivingly connected to the drive shaft, and a propeller mounted on the propeller shaft.

U.S. Pat. No. 5,494,466 discloses a transmission for a single engine drive for dual concentric propellers in a straight or V-drive arrangement with the straight-drive including four shafts and nine gears and the V-drive adding two more shafts and four more gears.

U.S. Pat. No. 7,891,263 discloses a shifting mechanism for an outboard drive of a watercraft. The shifting mechanism is located on a drive train generally aligned along a vertical axis and above a propulsion shaft of the lower unit. The drive train includes a rotatable input shaft which is driven by a motor.

U.S. Pat. No. 8,303,359 discloses an outboard motor that includes a transmission mechanism mounted between an output shaft of an engine and a propeller drive shaft. The transmission mechanism includes a clutch.

U.S. Patent Application Publication No. 2007/0125192 discloses a two speed transmission that includes an input shaft; a layshaft spaced from the input shaft; a first gear train connecting the input shaft to the layshaft; a second gear train connecting the layshaft to an output shaft the gear train including a one way clutch or similar; and a clutch for engaging the input shaft with the output shaft. The transmission is arranged such that when the output shaft is disengaged from the input shaft power is transmitted to the output shaft via the first and second gear trains and the layshaft.

U.S. Patent Application Publication No. 2014/0045393 discloses an outboard motor that is mounted on a stern of a boat and provided with a transmission and an oil pump. The transmission has a first-speed and second-speed gears, a first-speed gear clutch made of a mechanical dog clutch and a second-speed gear clutch made of a hydraulic clutch each adapted to engage the first and second-speed gears on a power transmission shaft, and a first-speed gear shift actuator adapted to couple the first-speed gear clutch with the first-speed gear. In the transmission, a first speed is established when the first-speed gear is engaged on the power transmission shaft and a second speed is established when the second-speed gear is engaged on the power transmission shaft while the first speed has been established such that power of the engine is transmitted to the propeller through the established speed.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples disclosed herein, a transmission is for an outboard marine engine. The transmission comprises a rotatable input shaft that is rotated by an internal combustion engine, a rotatable output shaft that powers a propulsor, a forward gear that causes forward rotation of the output shaft and propulsor, a reverse gear that causes reverse rotation of the output shaft and propulsor, and a clutch that is movable between a forward clutch position wherein the forward gear causes the forward rotation of the output shaft and propulsor and a reverse clutch position wherein the reverse gear causes the reverse rotation of the output shaft and propulsor. An internal ring gear couples the output shaft to one of the forward gear and the reverse gear. In certain examples, the transmission includes a layshaft that has a first gear coupled directly or indirectly to the reverse gear and a second gear coupled directly or indirectly to the output shaft. The layshaft transfers power from the input shaft to the output shaft only when the clutch is moved into one of the forward clutch and reverse clutch positions. In certain examples, the internal ring gear provides a speed reduction from the input shaft to the output shaft.

BRIEF DESCRIPTION OF THE DRAWINGS

The present disclosure is described with reference to the following Figures. The same numbers are used throughout the Figures to reference like features and like components.

DETAILED DESCRIPTION OF THE DRAWINGS

Figure 1:
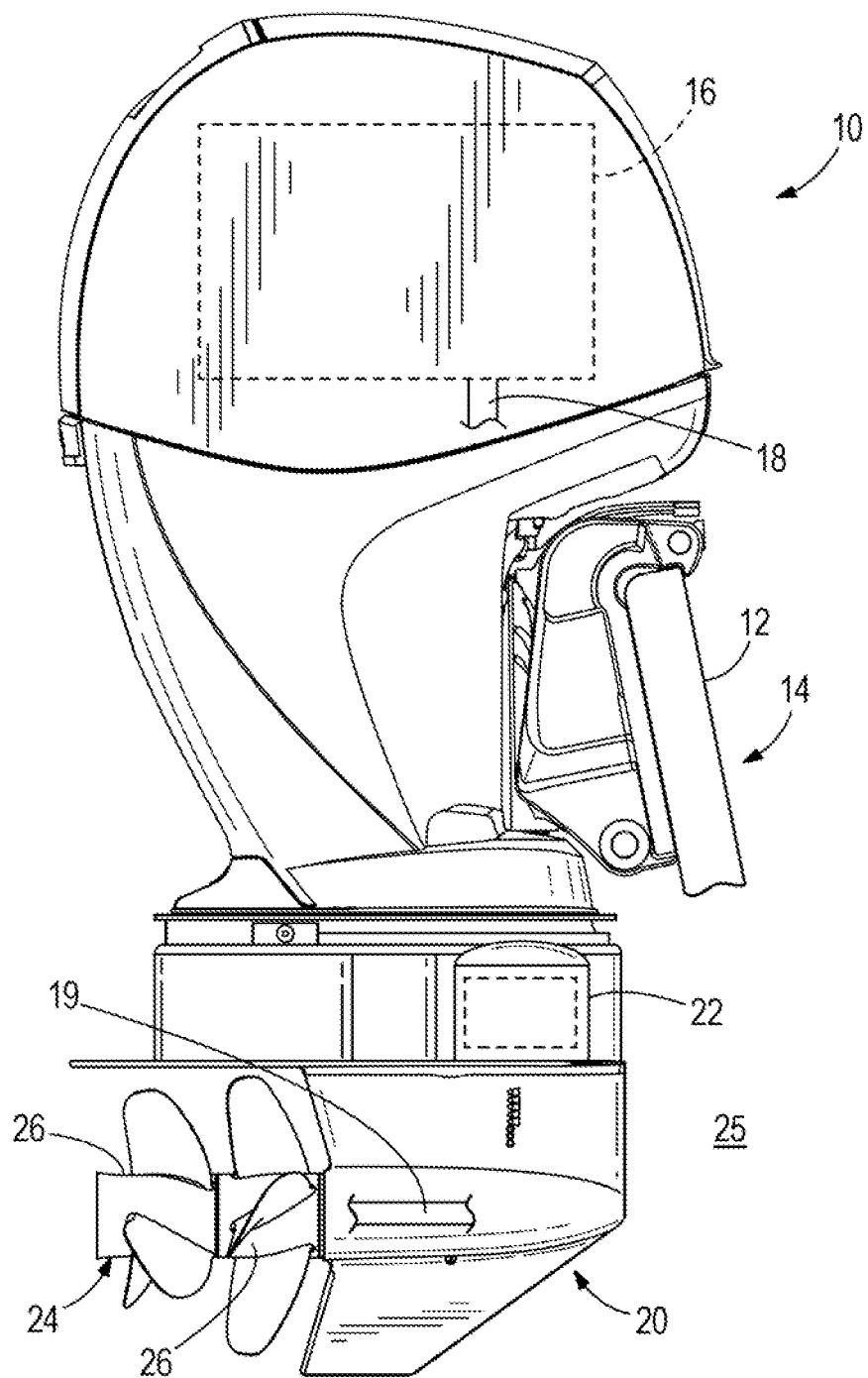
FIG. 1 is a side view of an outboard marine engine coupled to a marine vessel.

FIG. 1 depicts an outboard marine engine 10 that is connected to a transom 12 of a marine vessel 14. The outboard marine engine 10 has an internal combustion engine 16 that causes one-way rotation of a drive shaft 18, as is conventional. Rotation of the drive shaft 18 is transferred via a transmission 22 to a propulsor shaft 19 located in gear case housing 20. The transmission 22 is operable in Forward, Neutral and Reverse gears. Rotation of the propulsor shaft 19 in Forward and Reverse gears causes forward and reverse rotation of a propulsor 24, respectively. In this example, the propulsor 24 includes counter rotating propellers 26. In alternate embodiments, the propulsor 24 can include single propellers, more than two propellers, one or more impellers, and/or any other similar device(s) for creating a thrust force in water 25 to propel the marine vessel 14.

Figure 2:
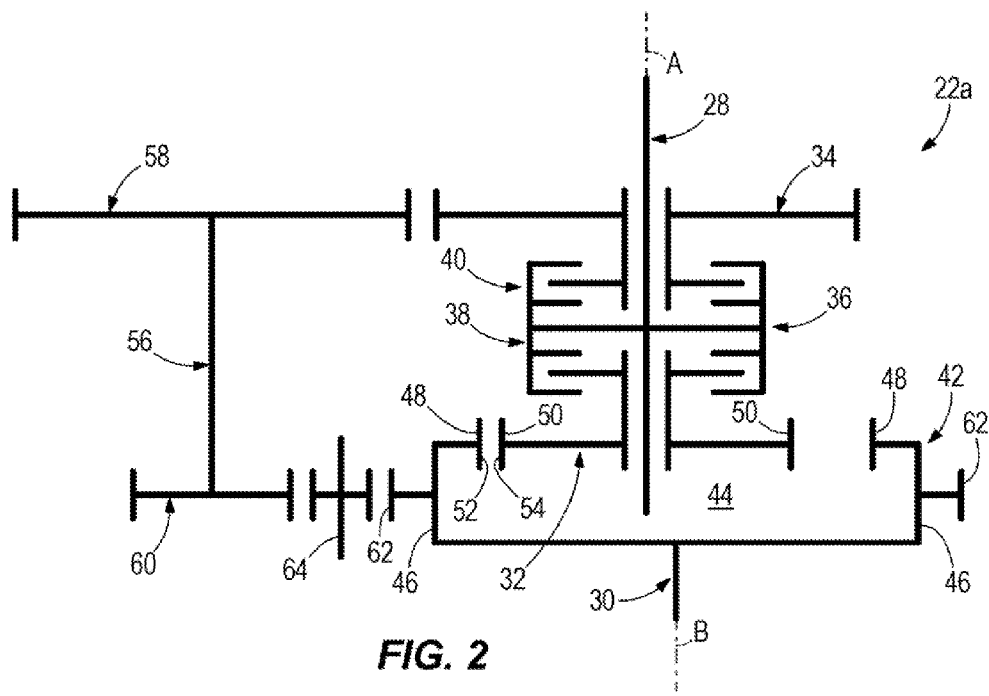
FIG. 2 is a schematic depiction of a transmission for the outboard marine engine.
Figure 3:
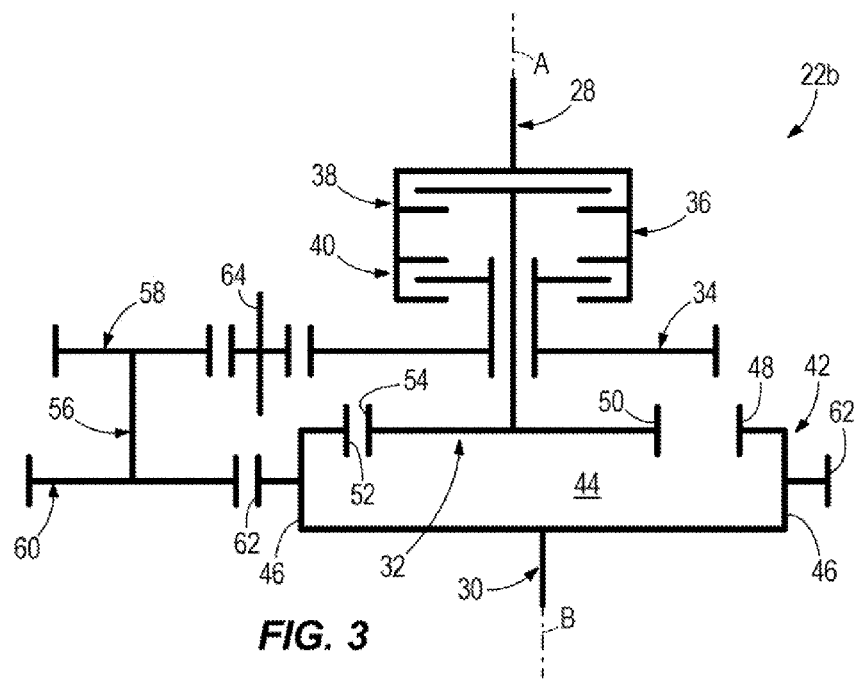
FIG. 3 is a schematic depiction of another example of a transmission for the outboard marine engine.
Figure 4:
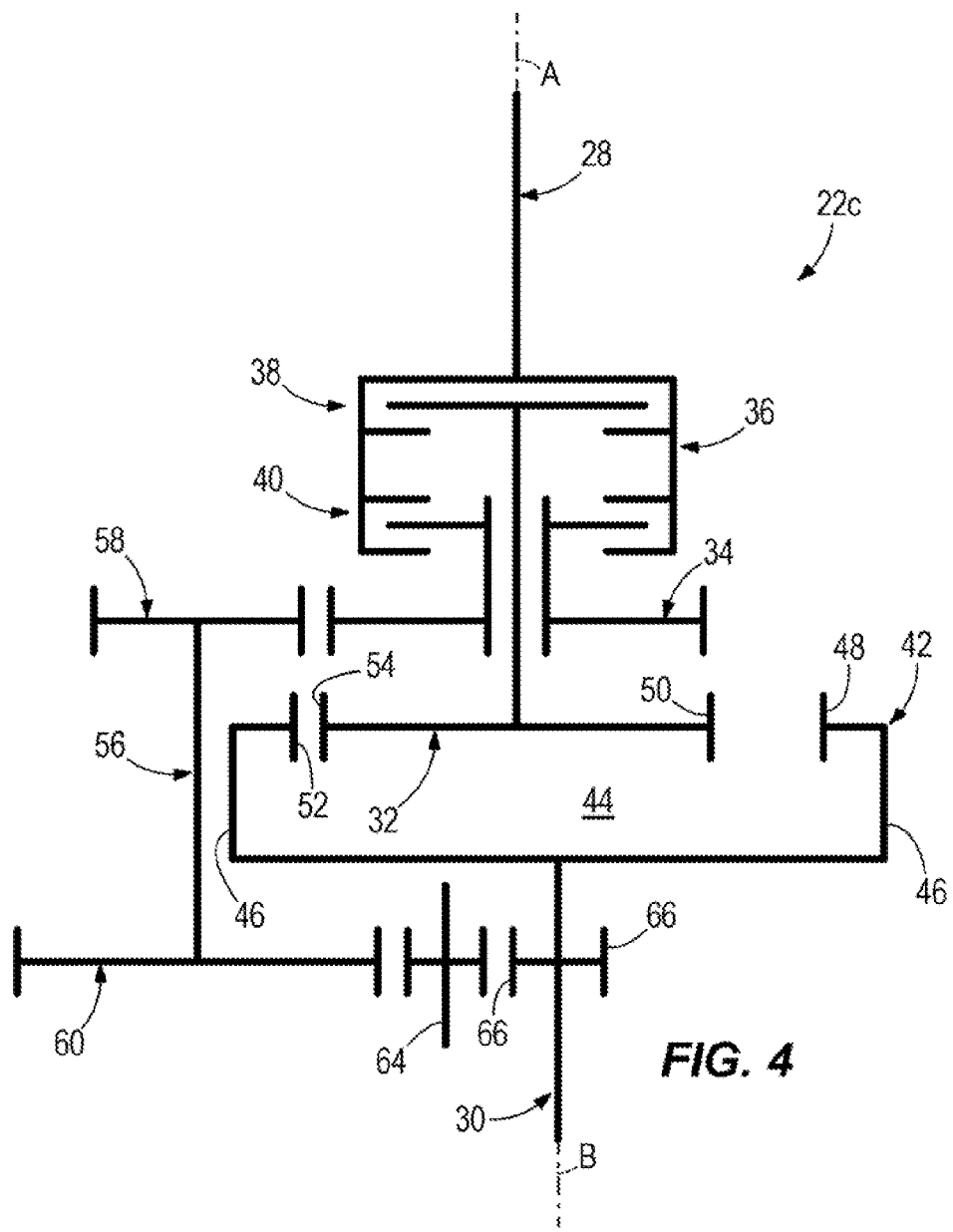
FIG. 4 is a schematic depiction of another example of a transmission for the outboard marine engine.

FIGS. 2-4 are schematic depictions showing different embodiments of the transmission 22. Each embodiment has various components that are rotatably coupled together via engagement surfaces. The engagement surfaces are schematically represented in the figures by vertically-oriented parallel lines. In certain examples, these engagement surfaces have complementary gear teeth that are meshed together so that rotation of one component causes opposite rotation of the other component. The gear teeth are also schematically represented by the vertically-oriented parallel lines.

FIG. 2 depicts one example 22a of the transmission 22. The transmission 22a includes an input shaft 28, which can be the drive shaft 18 and/or an extension of the drive shaft 18. The input shaft 28 rotates about its own center axis (i.e. axis A). The transmission 22a also includes a rotatable output shaft 30 that is directly or indirectly connected to the propulsor shaft 19 so that rotation of the output shaft 30 causes rotation of the propulsor shaft 19 and the propulsor 24. That is, the output shaft 30 powers the propulsor 24 via propulsor shaft 19. The output shaft 30 rotates about its own center axis (i.e. axis B). Axis B is laterally offset from axis A.

The transmission 22a also includes a forward gear 32 that causes forward rotation of the output shaft 30 and propulsor 24. The forward gear 32 rotates forwardly about its own center axis (axis A). The transmission 22a also includes a reverse gear 34 that causes opposite, reverse rotation of the output shaft 30 and propulsor 24. The reverse gear 34 rotates forwardly about its own center axis (axis A). The transmission 22a also includes a clutch 36 that has a forward clutch position shown schematically at 38 wherein the input shaft 28 is connected to the forward gear 32 such that the forward gear 32 rotates with the input shaft 28 and causes forward rotation of the output shaft 30 and propulsor 24. The clutch 36 also has a reverse clutch position schematically shown at 40 wherein the input shaft 28 is connected to the reverse gear 34 such that the reverse gear 34 rotates with the input shaft 28 and ultimately causes reverse rotation of the output shaft 30 and propulsor 24, as will be described further herein below. The type of clutch 36 can vary and in some examples can include a conventional cone clutch or dog clutch. FIG. 2 schematically depicts the clutch 36. The noted forward and reverse clutch position configurations are schematically shown by horizontally-oriented parallel lines.

The transmission 22a includes an internal ring gear 42 that couples the output shaft 30 to the forward gear 32. The ring gear 42 has a side wall 46 that defines a cavity 44. The forward gear 32 extends at least partially into the cavity 44. A radially-inwardly facing engagement surface 48 extends inwardly from and around the interior of the sidewall 46. The forward gear 32 has a circumferential outer engagement surface 50 that engages with one side of the radially inwardly facing engagement surface 48 such that forward rotation of the forward gear 32 causes forward rotation of the ring gear 42 and the output shaft 30. This is schematically shown by vertically-oriented parallel lines 52, 54. The ring gear 42 and output shaft 30 rotate together and can be integrally formed together or can be separate components that are fixed together. Rotation of the ring gear 42 causes rotation of the output shaft 30 in the same direction. A first set of engagement teeth (shown schematically at 52) are disposed on the radially inwardly facing engagement surface 48. A second set of engagement teeth (shown schematically at 54) are disposed on the circumferential outer engagement surface 50. The first set of engagement teeth 52 mesh with the second set of engagement teeth 54 such that forward rotation of the forward gear 32 causes forward rotation of the ring gear 42 and output shaft 30.

The transmission 22a also includes a layshaft 56 that has a first gear 58 coupled to the reverse gear 34 and a second gear 60 coupled to the output shaft 30, in this example via an idler gear 64. In this example the first gear 58 has a larger diameter than the second gear 60. The layshaft 56 transfers power from the input shaft 28 and reverse gear 34 to the idler gear 64, ring gear 42, output shaft 30, propulsor shaft 19, and propulsor 24 when the clutch 36 is in the reverse clutch position 40.

In the example shown in FIG. 2, the first gear 58 of the layshaft 56 is directly connected to the reverse gear 34 such that forward rotation of the reverse gear 34 causes reverse rotation of the layshaft 56, including the first and second gears 58, 60. The second gear 60 of the layshaft 56 is indirectly connected to the ring gear 42 via the idler gear 64 such that reverse rotation of the layshaft 56 causes forward rotation of the idler gear 64, which in turn causes reverse rotation of the ring gear 42 and output shaft 30. The sidewall 46 of the ring gear 42 has an external engagement surface 62. The idler gear 64 is rotatably connected to the external engagement surface 62 such that rotation of the idler gear 64 causes opposite rotation of the ring gear 42. The idler gear 64 thus connects the second gear 60 of the layshaft 56 to the external engagement surface 62 of the ring gear 42.

In FIG. 2, the clutch 36 is disposed between the forward gear 32 and reverse gear 34. When the clutch 36 is in the forward clutch position 38, forward rotation of the input shaft 28 is transferred by the clutch 36 to the forward gear 32. The forward gear 32 causes forward rotation of the ring gear 42, which in turn causes forward rotation of the output shaft 30. The idler gear 64, layshaft 56, and reverse gear 34 are free to rotate. When the clutch 36 is in the reverse clutch position 40, forward rotation of the input shaft 28 causes forward rotation of the reverse gear 34. Forward rotation of the reverse gear 34 causes reverse rotation of the layshaft 56, including the first gear 58 and second gear 60. Reverse rotation of the second gear 60 causes forward rotation of the idler gear 64, which in turn causes reverse rotation of the ring gear 42 and output shaft 30. The forward gear 32 is free to rotate.

FIG. 3 depicts another example 22b of the transmission 22. In this example, the clutch 36 is disposed between the input shaft 28 and the reverse gear 34. Unlike the example in FIG. 1, the clutch 36 is not disposed between the forward gear 32 and reverse gear 34. In this example, the idler gear 64 connects the first gear 58 of the layshaft 56 to the reverse gear 34. The second gear 60 of the layshaft 56 is directly connected to the external engagement surface 62 of the internal ring gear 42. In this example, the first gear 58 has a smaller diameter than the second gear 60.

In the example shown in FIG. 3, when the clutch 36 is in the forward clutch position 38, forward rotation of the input shaft 28 is transferred by the clutch 36 to the forward gear 32. Forward rotation of the forward gear 32 causes forward rotation of the ring gear 42, which in turn causes forward rotation of the output shaft 30. The idler gear 64, layshaft 56 and reverse gear 34 are free to rotate. When the clutch 36 is in the reverse clutch position 40, forward rotation of the input shaft 28 causes forward rotation of the reverse gear 34. Forward rotation of the reverse gear 34 causes reverse rotation of the idler gear 64, which in turn causes forward rotation of the layshaft 56. Forward rotation of the layshaft 56 causes reverse rotation of the ring gear 42 and output shaft 30. The forward gear 32 is free to rotate.

FIG. 4 depicts another example 22c of the transmission 22. In this example, the second gear 60 of the layshaft 56 is connected to the idler gear 64, which in turn is connected to the output shaft 30. The first gear 58 of the layshaft 56 is directly connected to the reverse gear 34. In this example the first gear 58 has a smaller diameter than the second gear 60. When the clutch 36 is in the forward clutch position 38, forward rotation of the input shaft 28 is transferred by the clutch 36 to the forward gear 32. The forward gear 32 causes forward rotation of the ring gear 42, which in turn causes forward rotation of the output shaft 30. The idler gear 64, layshaft 56 and reverse gear 34 are free to rotate. When the clutch 36 is in the reverse clutch position 40, forward rotation of the input shaft 28 causes forward rotation of the reverse gear 34. Forward rotation of the reverse gear 34 causes reverse rotation of the layshaft 56, which in turn causes forward rotation of the idler gear 64. Forward rotation of the idler gear 64 causes reverse rotation of the ring gear 42 and output shaft 30. The forward gear 32 is free to rotate.

Through research and experimentation, the present inventors have determined that providing the transmission 22 with the internal ring gear 42 provides a ratio (i.e. speed reduction) from the input shaft 28 to the output shaft 30 and maintains proper shaft direction of rotation without the need for a counter shaft. The present disclosure thus advantageously provides transmission assemblies having compact dimensions and power flow for forward, neutral and reverse gears.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A transmission for an outboard marine engine, the transmission comprising:
   a rotatable input shaft that is rotated by an internal combustion engine;
   a rotatable output shaft that powers a propulsor;
   a forward gear that causes forward rotation of the output shaft and propulsor;
   a reverse gear that causes reverse rotation of the output shaft and propulsor;
   a clutch that is movable between a forward clutch position wherein the forward gear causes the forward rotation of the output shaft and propulsor and a reverse clutch position wherein the reverse gear causes the reverse rotation of the output shaft and propulsor;
   an internal ring gear that couples the output shaft to one of the forward gear and the reverse gear; and
   a layshaft having a first gear coupled to the other of the forward gear and the reverse gear and a second gear coupled to the output shaft, wherein the layshaft transfers power from the input shaft to the output shaft only when the clutch is moved into one of the forward clutch and reverse clutch positions.

2. The transmission according to claim 1, wherein the input shaft and output shaft are laterally offset from each other.

3. The transmission according to claim 1, wherein the internal ring gear defines a cavity and wherein the one of the forward gear and the reverse gear extends into the cavity.

4. The transmission according to claim 3, wherein the cavity is defined by a sidewall having a radially inwardly facing engagement surface, and wherein the one of the forward gear and the reverse gear comprises an outer engagement surface that engages with the radially inwardly facing engagement surface.

5. The transmission according to claim 4, further comprising a first set of engagement teeth on the radially inwardly facing engagement surface and a second set of engagement teeth on the outer engagement surface, wherein the first set of engagement teeth meshes with the second set of engagement teeth such that rotation of the one of the forward gear and the reverse gear causes rotation of the internal ring gear and the output shaft.

6. The transmission according to claim 5, wherein the cavity is defined by a sidewall having a radially inwardly facing engagement surface, and wherein the one of the forward gear and the reverse gear comprises an outer engagement surface that engages with the radially inwardly facing engagement surface;
   a layshaft having a first gear coupled to the other of the forward gear and the reverse gear and a second gear coupled to the output shaft, wherein the layshaft transfers power from the input shaft to the output shaft only when the clutch is moved into one of the forward clutch and reverse clutch positions; and
   wherein the sidewall comprises an outer engagement surface and wherein the second gear of the layshaft is coupled to the output shaft via the outer engagement surface of the sidewall.

7. The transmission according to claim 6, further comprising an idler gear that connects the second gear of the layshaft to the outer engagement surface of the sidewall.

8. The transmission according to claim 1, further comprising an idler gear that connects the second gear of the layshaft to the output shaft.

9. The transmission according to claim 1, further comprising an idler gear that connects the first gear of the layshaft to the other of the forward gear and the reverse gear.

10. A transmission for an outboard marine engine, the transmission comprising:
   a rotatable input shaft that is rotated by an internal combustion engine;
   a rotatable output shaft that powers a propulsor;
   a forward gear that causes forward rotation of the output shaft and propulsor;
   a reverse gear that causes reverse rotation of the output shaft and propulsor;
   a clutch that is movable between a forward clutch position wherein the forward gear causes the forward rotation of the output shaft and propulsor and a reverse clutch position wherein the reverse gear causes the reverse rotation of the output shaft and propulsor;
   an internal ring gear that couples the output shaft to the forward gear;
   wherein the internal ring gear comprises a sidewall having a radially inwardly facing engagement surface;
   wherein the forward gear comprises an outer engagement surface that engages with the radially inwardly facing engagement surface such that forward rotation of the forward gear causes forward rotation of the internal ring gear and the output shaft; and
   a layshaft having a first gear coupled to the reverse gear and a second gear coupled to the output shaft, wherein the layshaft transfers power from the input shaft to the output shaft only when the clutch is moved into the reverse clutch position.

11. The transmission according to claim 10, wherein the sidewall comprises an outer engagement surface and wherein the second gear of the layshaft is coupled to the output shaft via the outer engagement surface of the sidewall.

12. The transmission according to claim 11, further comprising an idler gear that connects the second gear of the layshaft to the outer engagement surface.

13. The transmission according to claim 10, further comprising an idler gear that connects the second gear of the layshaft to the output shaft.

14. The transmission according to claim 10, further comprising an idler gear that connects the first gear of the layshaft to the other of the forward gear and the reverse gear.

15. The transmission according to claim 10, wherein the clutch is disposed between the forward gear and the reverse gear.

16. The transmission according to claim 10, wherein the clutch is disposed between the input shaft and the reverse gear.

17. A transmission for an outboard marine engine, the transmission comprising:
   a rotatable input shaft that is rotated by an internal combustion engine;
   a rotatable output shaft that powers a propulsor;
   a forward gear that causes forward rotation of the output shaft and propulsor;
   a reverse gear that causes reverse rotation of the output shaft and propulsor;
   a clutch that is movable between a forward clutch position wherein the forward gear causes the forward rotation of the output shaft and propulsor and a reverse clutch position wherein the reverse gear causes the reverse rotation of the output shaft and propulsor;
   an internal ring gear that couples the output shaft to the forward gear;
   wherein the internal ring gear comprises a sidewall having a radially inwardly facing engagement surface, and
   wherein the forward gear comprises an outer surface that engages with the radially inwardly facing engagement surface such that forward rotation of the forward gear causes forward rotation of the internal ring gear and the output shaft; and
   a layshaft having a first gear coupled to the reverse gear and a second gear coupled to the output shaft, wherein the layshaft transfers power from the input shaft to the output shaft only when the clutch is moved into the reverse clutch position;
   wherein the input shaft and output shaft are laterally offset from each other.

18. The transmission according to claim 17, further comprising an idler gear that connects the first gear of the layshaft to an outer engagement surface on the internal ring gear, wherein the clutch is disposed between the forward gear and the reverse gear.

19. The transmission according to claim 17, further comprising an idler gear that connects the second gear of the layshaft to the reverse gear, wherein the clutch is disposed between the input shaft and the reverse gear.

20. The transmission according to claim 17, further comprising an idler gear that connects the first gear of the layshaft to the output shaft, wherein the clutch is disposed between the input shaft and the reverse gear.

* * * * *